(12) United States Patent
Yamamoto (10) Patent No.: US 9,185,294 B2
(45) Date of Patent: Nov. 10, 2015

(54) IMAGE APPARATUS, IMAGE DISPLAY APPARATUS AND IMAGE DISPLAY METHOD

(75) Inventor: Katsuya Yamamoto, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 630 days.

(21) Appl. No.: 13/444,039

(22) Filed: Apr. 11, 2012

(65) Prior Publication Data

US 2012/0274780 A1  Nov. 1, 2012

(30) Foreign Application Priority Data

Apr. 27, 2011  (JP) .................................. 2011-099911

(51) Int. Cl.
| | |
|---|---|
| H04N 5/225 | (2006.01) |
| H04N 5/228 | (2006.01) |
| H04N 5/232 | (2006.01) |
| H04N 5/77 | (2006.01) |
| H04N 5/907 | (2006.01) |
| H04N 9/804 | (2006.01) |

(52) U.S. Cl.
CPC ....... *H04N 5/23254* (2013.01); *H04N 5/23229* (2013.01); *H04N 5/23293* (2013.01); *H04N 5/23296* (2013.01); *H04N 5/772* (2013.01); *H04N 5/907* (2013.01); *H04N 9/8047* (2013.01)

(58) Field of Classification Search
CPC .............. H04N 5/225; H04N 5/23229; H04N 5/23254; H04N 5/23293; H04N 5/23296; H04N 5/33; H04N 5/232; G09G 5/373; G01S 3/7864; G06T 7/2033; G06T 2207/10016
USPC .............................................. 348/169, 222.1
See application file for complete search history.

(56) References Cited

U.S. PATENT DOCUMENTS

| | | | |
|---|---|---|---|
| 6,226,388 B1* | 5/2001 | Qian et al. | 382/103 |
| 8,081,804 B2 | 12/2011 | Sakaji et al. | |
| 2009/0009622 A1* | 1/2009 | Yoshida et al. | 348/222.1 |
| 2010/0013977 A1* | 1/2010 | Suzuki | 348/333.11 |
| 2010/0315517 A1 | 12/2010 | Nakamura | |
| 2012/0050587 A1 | 3/2012 | Yamamoto | |

FOREIGN PATENT DOCUMENTS

| | | |
|---|---|---|
| JP | 08-09227 | 1/1996 |
| JP | 2005-286550 | 10/2005 |
| JP | 2006-013919 | 1/2006 |
| JP | 2009-044463 | 2/2009 |
| JP | 2009-177503 | 8/2009 |

OTHER PUBLICATIONS

Office Action issued Dec. 9, 2014 in Japanese Patent Application No. 2011-099911.

* cited by examiner

*Primary Examiner* — Dave Czekaj
*Assistant Examiner* — Tsion B Owens
(74) *Attorney, Agent, or Firm* — Oblon, McClelland, Maier & Neusatdt, L.L.P.

(57) ABSTRACT

An image apparatus, comprising a image capture device that captures an image, a display device that displays the image, a display control block that enlarges and displays a first area, included in a first image, on the display device, a target setting block that sets an object in the first area as a target for tracking and a detecting block that detects a second area, including the object, in a second image which is specified to be displayed next on the display device in place of the first image, the display control block enlarging and displaying the second area on the display device.

11 Claims, 10 Drawing Sheets

IMAGE APPARATUS, IMAGE DISPLAY APPARATUS AND IMAGE DISPLAY METHOD

CROSS-REFERENCE TO RELATED APPLICATIONS

The present application claims priority to and incorporates by reference the entire contents of Japanese Patent Application No. 2011-099911 filed in Japan on Apr. 27, 2011.

BACKGROUND OF THE INVENTION

1. Field of the Invention

The present invention relates to an image apparatus, an image display apparatus and an image display method.

2. Description of the Related Art

Conventionally, a digital still camera (such as an image apparatus) records an image, captured by an imaging device having about ten million pixels, at about 30 fps to 60 fps (frames per second) with a full number of pixels. This is possible because imaging devices and the corresponding control technology has improved. If the number of recorded pixels is reduced, the image devices record images with a high frame rate, for example 1,200 fps. Some digital still cameras have a continuous shooting function, which allows the digital still camera to record plural images at a high frame rate continuously while the user keeps a release button pressed. This function is suitable for recording an image in the case of a fast moving object (such as a car and train) or an object moving unpredictably (such as a child and animal) to prevent the user from mistiming the photograph.

Plural images captured by the continuous shooting function are usually merged into one image file and saved in a memory card. Japanese laid open 2008-167067 discloses the technology in which plural images are merged and saved into one image file. A file format including plural images is defined by the Multi-Picture Format standard issued by Camera & Imaging Products Association in February 2009.

When the user has recorded plural images by the continuous shooting function, the user may wish to read out the image file and confirm the image, frame by frame, on the screen in order to select the best image. Hereinafter, the operation by which the plural images are displayed frame by frame is called frame-by-frame-forward-(backward). By the display, the user confirms the degree of focus and the expression of a face as being an object of interest (e.g. the face of child or animal) which is enlarged and displayed on the screen. In this manner, when a part of the image is enlarged and displayed on the screen, the user operation of reviewing frame-by-frame-forward-(backward) typically means that the position of the enlarged part on the screen and the magnification ratio to enlarge are fixed for the next (previous) images.

As described above, the continuous shooting function is used to record a moving object. Therefore, the position of the moving object may change frame by frame. As a result, when a part of an image is enlarged and displayed on the screen, if the user operates frame-by-frame-forward-(backward), the moving object may no longer be in the enlarged part of the screen in the next (previous) frames. Thus, in order to see the object, the user has to modify the position manually. This becomes cumbersome and problematic. Further, this problem is not limited only to the case of continuous shooting function. A similar problem will occur in the case of plural images recorded independently.

One purpose of the present embodiments of the invention is to provide an image apparatus, image display apparatus and image display method which are able to solve the above noted problem. In other words, as a result of the present improvements, when the user is confirming plural images with a part of the images being enlarged and displayed on the screen, the user is able to confirm the plural images efficiently without cumbersome operation.

SUMMARY OF THE INVENTION

An image apparatus of the present embodiments of the invention comprises an image capture device that captures an image, a display device that displays the image, a display control block that enlarges and displays a first area included in a first image on the display device, a target setting block that sets an object in the first area as a target for tracking and a detecting block that detects a second area, including the object, in a second image which is specified to be displayed next on the display device in place of the first image, wherein the display control block enlarges and displays the second area on the display device.

A display apparatus of the present embodiments of the invention comprises a display device that displays an image, a display control block that enlarges and displays a first area included in a first image on the display device, a target setting block that sets an object in the first area as a target for tracking and a detecting block that detects a second area, including the object, in a second image which is specified to be displayed next on the display device in place of the first image, wherein the display control block enlarges and displays the second area on the display device.

A displaying method of the present embodiments of the invention is performed by a display apparatus including a display device that displays an image. The method includes enlarging and displaying a first area included in a first image on the display device, setting an object in the first area as a target for tracking, detecting a second area, including the object, in a second image which is specified to be displayed next on the display device in place of the first image and enlarging and displaying the second area on the display device.

According to the present embodiments of the invention, when the first area included in the first image is enlarged and displayed on the display device, the object in the first area is set as the target for tracking and the second area including the object in the second image is enlarged and displayed in place of the first image. Thus, the user is able to confirm plural images efficiently without cumbersome operation.

DETAILED DESCRIPTION OF PREFERRED EMBODIMENTS

Here, the best mode of the present embodiments of the invention (image apparatus, image display apparatus and image display method) is explained referring to the figures. An example applying the present embodiments of the invention to a digital still camera (digital camera) is described below.

First Embodiment

Figure 1A:
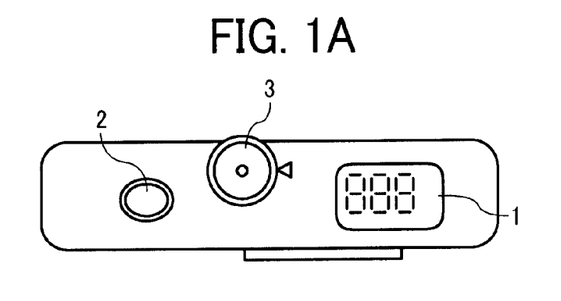
FIG. 1A is a top view illustrating a digital still camera.
Figure 1B:
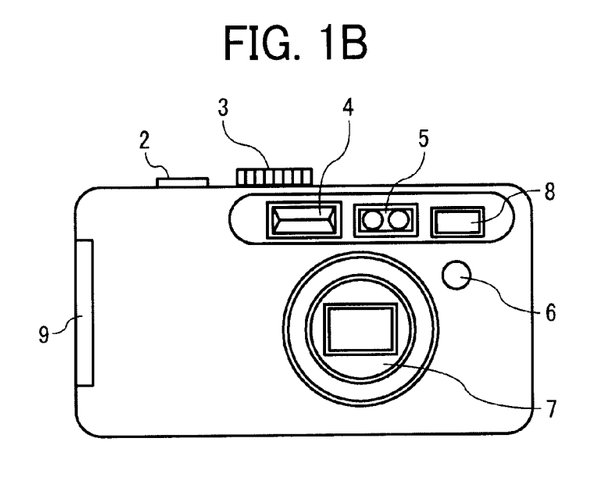
FIG. 1B is a front view illustrating a digital still camera.
Figure 1C:
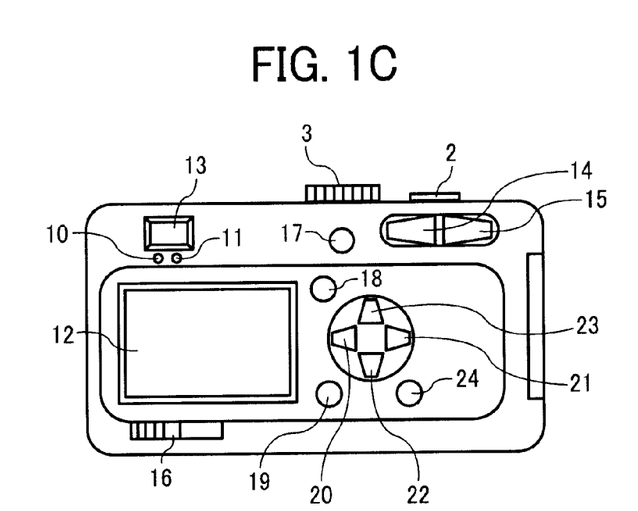
FIG. 1C is a rear view illustrating a digital still camera.

FIGS. 1A to 1C are diagrams illustrating the outward appearance of the digital camera according to the first embodiment. FIG. 1A is a top view illustrating the digital camera, FIG. 1B is a front view illustrating the digital camera, and FIG. 1C is a rear view illustrating the digital camera.

The digital camera of the first embodiment includes a sub LCD 1, a release shutter button 2 and a mode dial 3 on the top surface. The sub LCD displays a number of images available to be recorded. The release shutter button 2 is pushed in order to take a picture. The mode dial 3 selects a mode from a plurality of modes including a recording mode for recording images, a replay mode for replaying images and a setting mode for setting up the digital camera.

The digital camera of the first embodiment includes an AFLED (auto focus LED) 10 which emits light in response to an auto focus operation, a flash light LED 11 which emits light in response to a flash light operation, an LCD monitor 12 (display means) and an optical finder (rear) 13 on the rear surface. The LCD monitor 12 displays a setting view, a replayed image and a live view image (used as an electric finder).

The digital camera of the first embodiment includes a zoom button (WIDE) 14 which is operated in a zoom operation (WIDE), a zoom button (TELE) 15 which is operated in a zoom operation (TELE), a power switch 16, a self timer switch 17 which is operated in a self timer operation, a menu switch 18 which is operated in a setting menu, an OK switch 19 which is operated in accepting a selected item, a left/image confirm switch 20, a right switch 21, a down/macro switch 22, an up/flash light switch 23 and a display switch 24. The left/image confirm switch 20 is operated to confirm a recorded image on the LCD monitor 12 and to move the cursor to the left on the LCD monitor 12. The right switch 21 is operated to move the cursor to the right on the LCD monitor 12. The down/macro switch 22 is operated to record in macro mode and to move the cursor down on the LCD monitor 12. The up/flash light switch 23 is operated to change the flash light mode and to move the cursor up on the LCD monitor 12. The display switch 24 is operated to change display of the LCD monitor 12.

The LCD monitor 12 displays a mode setting display in response to the operation of the menu switch 18 in the digital camera. A continuous shooting mode is selected from the mode setting display on the LCD monitor 12 using the left/image confirm switch 20, the right switch 21, the down/macro switch 22 and/or the up/flash light switch 23. The continuous shooting mode is set by operating the OK switch 23. In the continuous shooting mode, plural images are captured continuously according to a single operation of the release shutter button 2. This corresponds to the continuous shooting function described above.

In replay mode, set by the mode dial 3, an image saved in a memory card 80 is displayed on the LCD monitor 12. In replay mode, the displayed image is enlarged with an predetermined magnification ratio by operation of the zoom button (WIDE) 14 and the zoom button (TELE) 15. While the enlarged image is displayed on the LCD monitor 12, the enlarged position is set by operation of the left/image confirm switch 20, the right switch 21, the down/macro switch 22 and/or the up/flash light switch 23.

Further, while the enlarged image is displayed on the LCD monitor 12, an enlarge-and-track-frame-by-frame-forward-(backward) mode (described below) is set by keeping the display switch 24 pushed for a period. In the enlarge-and-track-frame-by-frame-forward-(backward) mode, an frame-by-frame-forward operation is performed by operation of the right switch 21 and an frame-by-frame-backward operation is performed by operation of the left/image confirm switch 20. When the display switch 24 is pushed for a period, in the enlarge-and-track-frame-by-frame-forward-(backward) mode, then an enlarge display mode is set.

Figure 2:
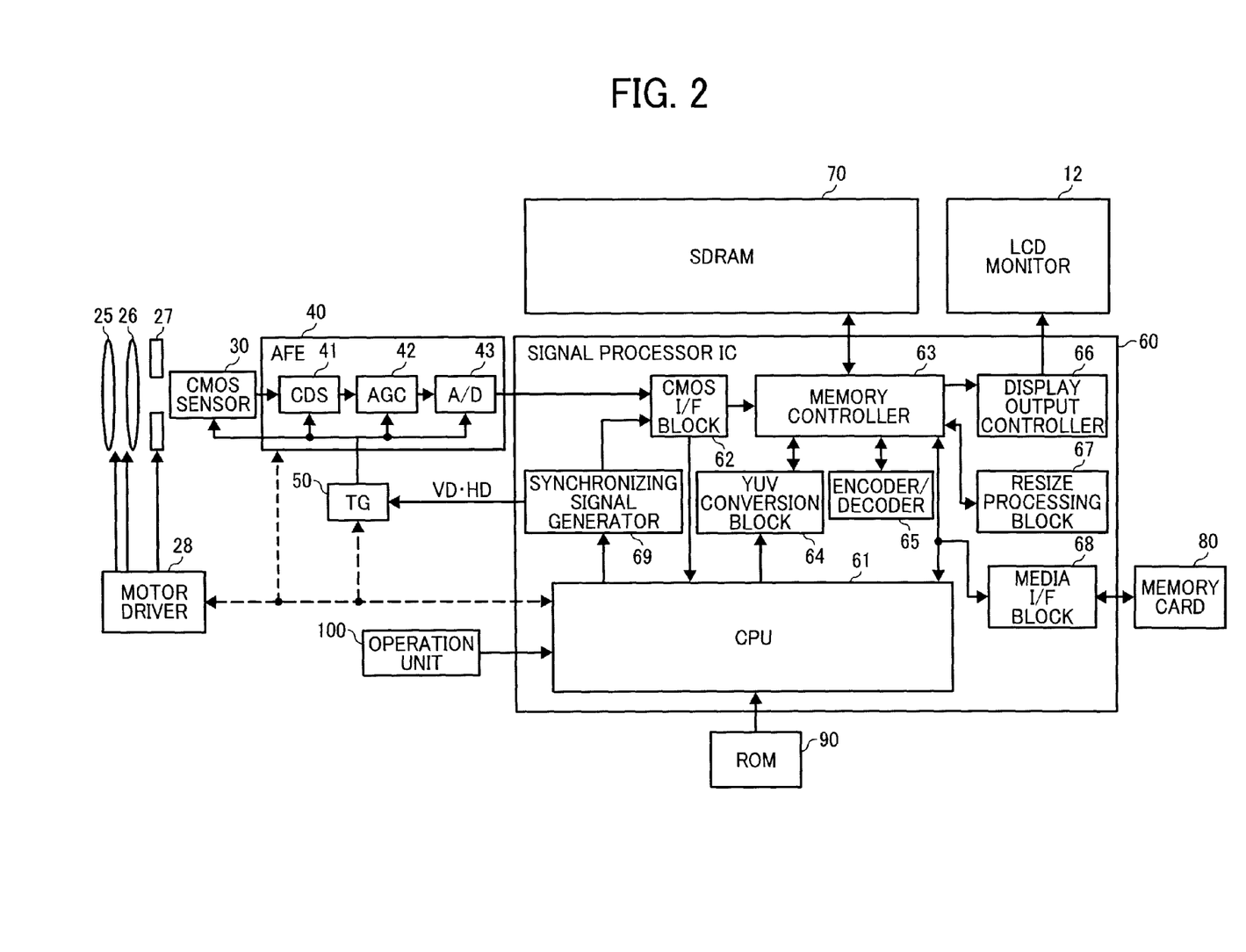
FIG. 2 is a block diagram illustrating a control system of the digital still camera.

FIG. 2 is a block diagram illustrating a control system of the digital still camera. The control system of the digital camera includes a motor driver 28, a CMOS sensor 30 which is an image sensor, an AFE (analog front end) 40, a TG (timing generator) 50 and a signal processor IC 60. The motor driver 28 drives a zoom lens 25, a focus lens 26 and a mechanical shutter 27. The AFE 40 generates digital image data from analog image data output by the CMOS sensor 30. The TG 50 outputs a timing signal to the CMOS sensor 30 and the AFE 40. The signal processor IC 60 performs digital signal processing on the digital image data from the AFE 40 and controls operation of the digital camera. The signal processor IC 60 is connected to the LCD monitor 12, a DRAM 70, the memory card 80, a ROM 90 and an operation unit 100.

The mechanical shutter 27 is a shutter operated mechanically. Light is incident on the CMOS sensor 30 when the mechanical shutter 27 is opened and light is blocked when the mechanical shutter 27 is closed. The motor driver 28 drives the zoom lens 25, the focus lens 26 which is an optical lens, and the mechanical shutter 27. A CPU 61 included in the signal processor IC 60 controls the motor driver 28 which drives the zoom lens 25, the focus lens 26, and the mechanical shutter 27.

The CMOS sensor 30 is a solid state image sensor having a conversion function which converts optical light to electrical signals. The CMOS sensor 30 outputs an electric signal proportional to the amount of light, when an object is imaged by the optical lens. The CMOS sensor 30 is driven by a timing signal supplied by the TG 50. Exposure control and read out control on each pixel is performed according to the timing signal. A signal from the CMOS sensor 30 is input to the AFE 40.

The AFE 40 includes a CDS (correlated double sampling) 41, an AGC (auto gain control) 42, and an A/D (analog to digital) converter 43. The CDS 41 performs sampling and holding (correlated double sampling) on analog image data output from the CMOS sensor 30. The AGC performs gain control on a signal sampled by the CDS 41. The A/D converter 43 converts a signal output from the AGC 42 to a digital image signal. Each part included in the AFE 40 is driven by a timing signal supplied by the TG 50 in synchronization with the CMOS sensor 30. Gain of the AGC 42 is set according to an order by the CPU 61 in the signal processor IC 60. The digital image signal output from the AFE 40 is input to the signal processor IC 60.

The TG 50 receives a VD signal (vertical synchronizing signal) and an HD signal (horizontal synchronizing signal) which are generated by a synchronizing signal generator 69 included in the signal processor IC 60. The TG 50 generates a timing signal for driving the CMOS sensor 30 and the AFE 40 according to the HD signal and the VD signal. The timing signal is input to the CMOS sensor 30 and the AFE 40.

The signal processor IC 60 includes the CPU 61, a CMOSI/F block 62, a memory controller 63, a YUV conversion block 64, an encoder/decoder 65, a display output controller 66, a resize processing block 67, a media I/F block 68 and the synchronizing signal generator 69. The CMOSI/F block 62 reads out digital image data from the AFE 40 in synchronization with the VD signal and the HD signal. The memory controller 63 controls write and read out from a SDRAM 70. The YUV conversion block 64 converts a digital image signal input from the CMOSI/F block 62 to YUV data for displaying and recording. The encoder/decoder 65 performs encode and decode processing in a certain file format such as JPEG. The display output controller 66 controls outputting of the image data to the LCD monitor 12 and to other external display devices. The resize processing block 67 changes the size of the image data corresponding to the size for displaying and recording. The media I/F block 68 controls write and read out from the memory card 80. The synchronizing signal generator 69 generates the VD signal and the HD signal.

The digital image data output from the AFE 40 is taken into the signal processor IC 60 via the CMOSI/F 62 per frame and image correction, such as black level, detective pixel, and shading, is performed by the signal processor IC 60. Then, the digital image data is saved as RGB-RAW image data in the SDRAM 70.

The RAW-RGB image data is read out by the memory controller 63, image correction, such as gain multiplication of white balance, gamma correction and RGB interpolating correction, is performed and the RAW-RGB image data is provided to the YUV conversion block 64. The YUV conversion block 64 performs image correction such as edge enhancement and color setting and converts the RAW-RGB image data to YUV image data (YCbCr). The YUV image data is saved in the SDRAM 70.

The YUV image data is read out by the memory controller 63 and is provided to the display output controller 66 with OSD (on screen display) data which displays an icon indicating the operation mode. The display output controller 66 combines the YUV image data and the OSD data and generates display data. The display output controller 66 combines the display data with a synchronization signal and provides the combination to the LCD monitor 12. The display output controller 66 provides the display signal as a TV video signal for an external display device. In case the external display device is a TV in the NTSC system, the resize processing block 67 adjusts the size horizontally and vertically and provides the adjusted signal to the TV.

Recording data stored in the memory card 80 is now described. The YUV image data is read out by the memory controller 63 and is provided to the encoder/decoder 65 based on a command from the CPU 61. The encoder/decoder 65 generates compressed data such as JPEG. The YUV image data, saved in the SDRAM 70, corresponds to the full size of the CMOS sensor 30. If the size of the image data to be saved in the memory card 80 is smaller than the size of the image data produced by the CMOS sensor 30, the resize processing block 67 reduces the size for recording and provides the reduced data to the encoder/decoder 65. The compressed data is saved in the SDRAM 70 and recorded in the memory card 80 via the media I/F block after adding a header. When plural images, obtained by continuous shooting mode, are recorded in the memory card 80, the plural images may be recorded as one file such as a file of the Multi-Picture Format standard.

When an image saved in the memory card 80 is replayed, the compressed data, saved in the memory card 89, is read out via the media I/F block 68 and is saved in the SDRAM 70 based on a command from the CPU 61. Then, the compressed data is provided to the encoder/decoder 65. The YUV image data decoded by the encoder/decoder 65 is provided to the display output controller 66. The display output controller 66 generates display data and outputs the display data to the LCD monitor 12. In this manner, an image is displayed (replayed) on the LCD monitor 12. When an enlarged image is displayed on the LCD monitor 12, the display output controller 66 outputs display data of the enlarged image to the LCD monitor 12 based on a command from the CPU 61. In this manner, the enlarged image is displayed.

Each part included in the signal processor IC 60 performs processing according to the CPU 61. For example, the CPU 61 loads a control program and control data from the SDRAM 70. The control program and control data is saved in the ROM 90, for example, and is used to control the digital camera. The CPU 61 controls the whole operation of the digital camera according to the control program and control data. In other words, the CPU 61 controls the motor driver 28, the AFE 40, the TG 50 and the other parts of the signal processor IC 60 so that a proper image is captured, recorded and displayed according to the direction from the operation unit 100, direction from the remote controller and so on. The operation unit 100 accepts input from the user and includes buttons and switches such as the release shutter button 2, the zoom buttons 14, 15, the menu switch 18, the right switch 21, the left/image confirm switch 20, the display switch 24 and so on.

The digital camera of the present embodiment performs enlarge-and-track-frame-by-frame-forward-(backward). The enlarge-and-track-frame-by-frame-forward-(backward) is defined by the procedure as shown below.

When plural images from continuous shooting are read out the memory card 80 and are displayed on the LCD monitor 12 frame-by-frame, an object, included in part of an image enlarged and displayed, is set as a target for tracking. In the case of performing enlarge-and-track-frame-by-frame-forward, an area including the object, set as the target for tracking, is detected from a next image (later in time) to be displayed, and the area, in the next image (later in time), is displayed on the LCD monitor 12. In the case of performing enlarge-and-track-frame-by-frame-backward, an area including the object, set as the target for tracking, is detected from a next image (previous in time) to be displayed, and the area, in the next image (previous in time), is displayed on the LCD monitor 12.

Figure 3:
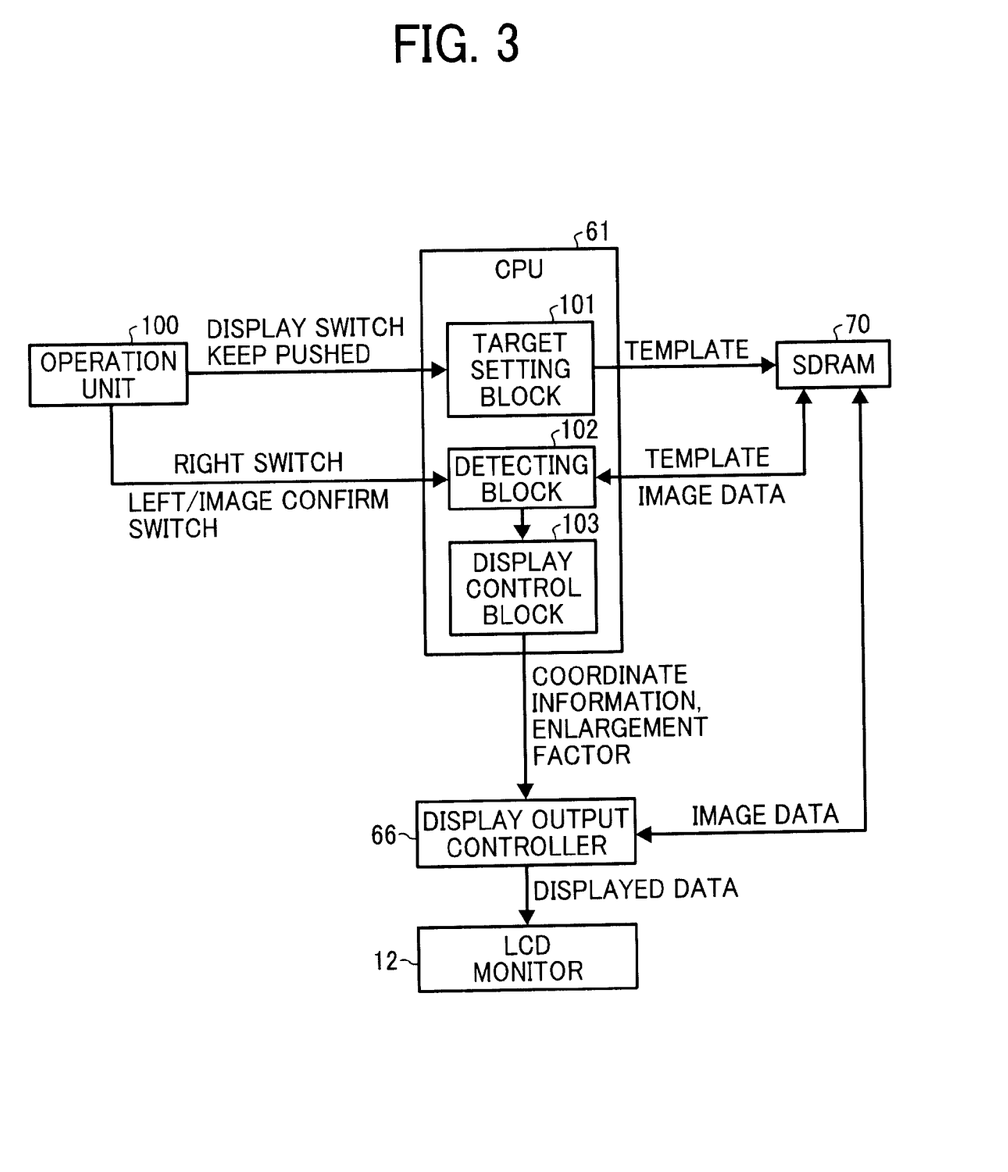
FIG. 3 is a block diagram illustrating a control system of CPU to perform enlarge-and-track-frame-by-frame-forward-(backward) operation.

FIG. 3 is a functional block diagram illustrating the CPU 61 which performs the enlarge-and-track-frame-by-frame-forward-(backward) operation. The CPU 61 implements the function of a target setting block 101, a detecting block 102 and a display control block 103 by executing the control program stored in the ROM 90. In the present embodiment, the CPU 61 implements these functions by executing the control program. Alternatively, specific hardware such as an ASIC (application specific integrated circuit) or a FPGA (field-programmable gate array) may be substituted for the control program to realize some or all of these functions.

When the first part of the first image is enlarged and displayed on the LCD monitor 12 and the user keeps the display switch 24 of the operation unit 100 pushed for a period, the target setting block 101 sets an object included in the first part displayed on the LCD monitor 12 as the target for tracking. Tracking is defined as a process to track an object set as the target among different plural images. Various methods of tracking are available in the present embodiment.

Tracking technology is generally used in an area for AF (auto focus) and AE (auto exposure) for an object to be photographed. The present embodiment uses tracking technology to perform enlarge-and-track-frame-by-frame-forward-(backward) when the image is enlarged and displayed. In other words, in the case of performing enlarge-and-track-frame-by-frame-forward-(backward), the object is tracked among different images using tracking technology and the object is enlarged and displayed. If the digital camera of the present embodiment has the function of tracking for AF and AE (tracking object block for capturing), it is desirable to use this common function for performing enlarge-and-track-frame-by-frame-forward-(backward). Since the function of the tracking object block for capturing may also be used to enlarge-and-track-frame-by-frame-forward-(backward), the number of programs used for tracking the object is reduced and the capacity of the ROM 90 is conserved, resulting in the cost being reduced.

Here, for example, general template matching is used to track the object. The target setting block 101 extracts an amount of characteristic (characteristic of brightness or color, edge changing brightness or color dramatically or object shape identified from edge and so on) from the image enlarged and displayed on the LCD monitor 12. The extracted amount of characteristic is set as the template and saved in the SDRAM 70. The process described above corresponds to the target setting for tracking the object.

In the present embodiment, in order to transition to enlarge-and-track-frame-by-frame-forward-(backward), an exemplary operation is to keep the display switch 24 pushed for a period. Other operations for initiating the transition are alternatively available. In the present embodiment, images are displayed frame-by-frame as the user operates the right switch 21 and the left/image confirm switch 20. Alternatively, the digital camera changes images frame-by-frame automatically according to a predetermined time without the user's operation.

The detecting block 102 detects an area, including the target, from a second image which is displayed after the first image currently displayed according to the user's operation. The target is set by the target setting block 101.

When the enlarge-and-track-frame-by-frame-forward-(backward) operation is available, and the user operates the right switch 21 (frame-by-frame-forward operation), the detecting block 102 specifies the image which is captured after the first image in time, as an image to be displayed next. Further, when the enlarge-and-track-frame-by-frame-forward-(backward) operation is available, and the user operates the left/image confirm switch 20 (frame-by-frame-backward operation), the detecting block 102 specifies the second image which is captured before the first image in time, as an image to be displayed next. The detecting block 102 reads out the template saved in the SDRAM 70 and detects the area including an amount of characteristic similar to the amount of characteristic in the template for the area including the object for tracking.

The display control block 103 processes the enlarging and displaying part of the image displayed in the LCD monitor 12. Specifically, the user is able to operate the operation unit 100 (the zoom button (WIDE) 14, the zoom button (TELE) 15, the left/confirm switch 20, the down/macro switch 22 and the up/flash light switch 23 etc.) affecting the images displayed on the LCD monitor 12 in replay mode. The display control block 103 specifies coordinate information showing the position and enlargement factor of the part set by the user's operation and outputs an enlarging and displaying command to the display output controller 66. The display controller 66 outputs the display data of the part specified by the user to the LCD monitor 12. The part specified by the user is enlarged and displayed on the LCD monitor 12.

The user operates the operation unit 100 using the right switch 21 (frame-by-frame-forward) and the left/confirm switch 20 (frame-by-frame-backward) in order to implement the enlarge-and-track-frame-by-frame-forward-(backward) operation. If the detecting block 102 detects an area including the target from the next displayed image, the display control block 103 performs a process for enlarging and displaying the detected area on the LCD monitor 12. Specifically, the display control block 103 specifies the coordinate information showing the position and enlargement factor of the area detected by the detecting block 102 in order to enlarge and display the area detected by the detecting block 102. The display control block 103 outputs an enlarging and displaying command to the display output controller 66. The display output controller 66 outputs display data of the area detected by the detecting block 102 to the LCD monitor 12. The area detected by the detecting block 102 is then enlarged and displayed on the LCD monitor 12.

During the enlarge-and-track-frame-by-frame-forward-(backward)-operation, unless the display switch 24 is kept pushed (exiting the mode), the detecting block 102 and the display control block 103 perform processing described above over and over according to the operation of the right switch 21 and the left/confirm switch 20. Therefore, the enlarge-and-track-frame-by-frame-forward-(backward) operation, which processes the enlarging and displaying area, including the object set as the target for tracking among the plural images, can be realized. According to the enlarge-and-track-frame-by-frame-forward-(backward) operation, since the area of interest, which includes the object, is enlarged and displayed according to the operation of enlarge-and-track-frame-by-frame-forward-(backward), the user does not have to perform a cumbersome operation. For instance, the user does not have to perform an operation such as correcting the enlarged position manually and the user can confirm the degree of focus regarding the object or the expression of the object efficiently.

Figure 4:
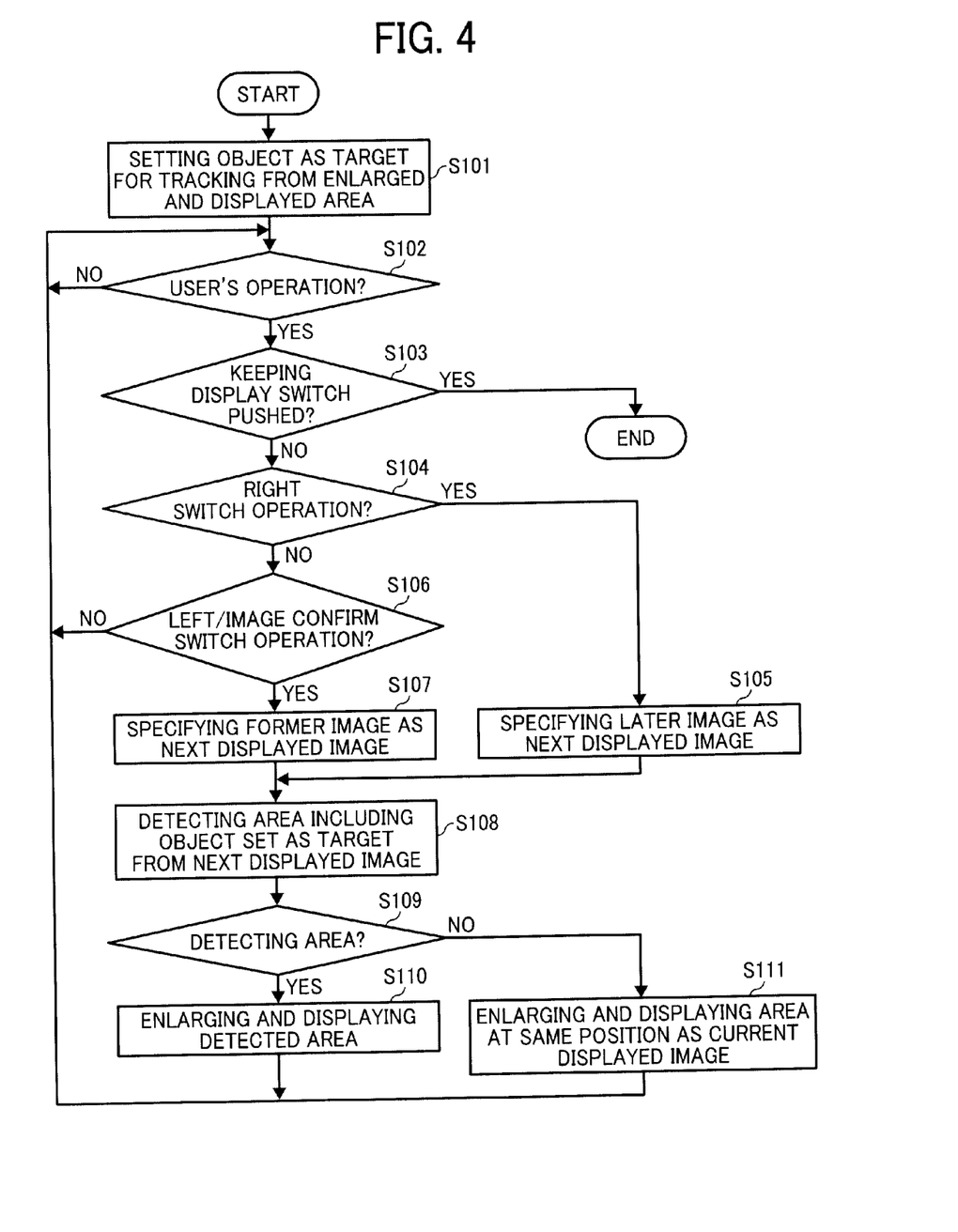
FIG. 4 is a flowchart illustrating a process flow for CPU in case performing enlarge-and-track-frame-by-frame-forward-(backward) operation relating to a first embodiment of the digital still camera.

FIG. 4 is a flowchart illustrating a process flow for the CPU 61 in the performance of the enlarge-and-track-frame-by-frame-forward-(backward) operation. The process flow shown in FIG. 4 starts when the user keeps the display switch 24 pushed for a predetermined period when part of the image is enlarged and displayed on the LCD monitor 12.

The target setting block 101 of the CPU 61 sets an object as a target for tracking, when the object is included in the area currently enlarged and displayed on the LCD monitor 12 (step S101). Specifically, the target setting block 101 extracts the amount of characteristic of the image from the area currently enlarged and displayed on the LCD monitor 12. The target setting block 101 saves the extracted amount of characteristic as a template in the SDRAM 70. When step S101 finishes, the process proceeds to step S102.

The CPU 61 checks whether the user operates the operation unit 100 (step S102). If the user performs some operation (step S102 YES), the flow proceeds to step S103. If the user does not perform any operation (step S102 NO), the CPU 61 continues checking.

The CPU 61 checks whether the user's operation is to keep the display switch 24 pushed (step S103) for a predetermined period of time. If the user's operation is not to keep the display switch 24 pushed (step S103 NO), the flow proceeds to step S104. If the user's operation is to keep the display switch 24 pushed (step S103 YES), the process flow finishes in FIG. 4. When the process flow finishes, the mode of the digital camera returns to normal enlarge and display mode.

The CPU 61 checks whether the user operates the right switch 21 (step S104). If the user operates the right switch 21 (step S104 YES), the flow proceeds to step S105. If the user does not operate the right switch 21 (step S104 NO), the flow proceeds to step S106.

The detecting block 102 in the CPU 61 specifies a later in time image than the current image, whose part is enlarged and displayed on the LCD monitor 12, as the next displayed image (step S105). When the step S105 finishes, the flow proceeds to step S108.

The CPU 61 checks whether the user operates the left/image confirm switch 20 (step S106). If the user operates the left/image confirm switch 20 (step S106 YES), the flow proceeds to step S107. If the user does not operate the left/image confirm switch 20 (step S106 NO), the flow proceeds to step S102 since the operation is not valid with respect to the enlarge-and-track-frame-by-frame-forward-(backward) operation.

The detecting block 102 in the CPU 61 specifies a previous in time image, than the current image, whose part is enlarged and displayed on the LCD monitor 12, as the next displayed image (step S107). When the step S107 finishes, the flow proceeds to step S108.

The detecting block 102 detects the area including the object set as the target, in step S101, from the next displayed image. Specifically, the detecting block 102 reads out the template saved in the SDRAM 70 by the target setting block 101. The detecting block 102 detects the area that includes the amount of characteristic which is similar to the amount of characteristic of the template and sets the detected area as the area including the object for tracking in the next displayed image (step S108). When the step S108 finishes, the process flow proceeds to step S109.

The display control block 103 in the CPU 61 determines whether to detect the area, including the object for tracking, from the next displayed image in step S105 or S107 (step S109). If the area is detected (step S109 YES), the flow proceeds to step S110. When the area is not detected (step S109 NO), the flow proceeds to step S111.

The display control block 103 outputs a command, which enlarges and displays the area detected in step S109 on the LCD monitor 12, to the display controller 66 (step S110). The command includes coordinate information and an enlargement factor for the area being enlarged and displayed as the next displayed image. The enlargement factor is determined so that the size of the object in the current displayed image is the same as the size of the object in the next displayed image. For example, the enlargement factor is proportionally determined according to the size of the object (tracked target) in the image, which is currently enlarged and displayed on the LCD monitor 12, and to the size of the object in the next displayed image. In step S110, the display of the LCD monitor 12 is updated and the area including the object (tracked target), in the next displayed image, is enlarged and displayed on the LCD monitor 12. When step S110 finishes, the flow returns to step S102.

In step S111, The display control block 103 outputs the command not to change the coordinate information and the enlargement factor of the area being enlarged and displayed, to the display output controller 66, when the next displayed image, specified in step S105 or S107, is displayed. In other words, the command includes coordinate information and an enlargement factor, which are the same as the coordinate information and enlargement factor of the enlarged and displayed area, for the image currently enlarged and displayed on the LCD monitor 12. According to step S111, the display of the LCD monitor 12 is updated and the same area as the current image is enlarged and displayed on the LCD monitor 12 for the next image. When the step S111 finishes, the flow returns to step S102.

In the above description, when the user operates the right switch 21 (frame-by-frame forward), the displayed image is switched from current displayed image to the next image. For example, in the case of plural recorded images included in one file, such as Multi-Picture Format, the images are displayed frame-by-frame, when the user operates the right switch 21 (frame-by-frame forward) the images are switched. If the currently displayed image is the last image in the file, the next displayed image may be the first image in the file.

Next, referring to FIGS. 5 to 8, transition of the enlarged and displayed image on the LCD monitor 12 is explained with respect to enlarge-and-track-frame-by-frame-forward-(backward). Here, FIGS. 5 to 8 show plural images of a running dog obtained by continuous shooting mode. In this example, the user confirms the dog's face in each image.

Figure 5A:
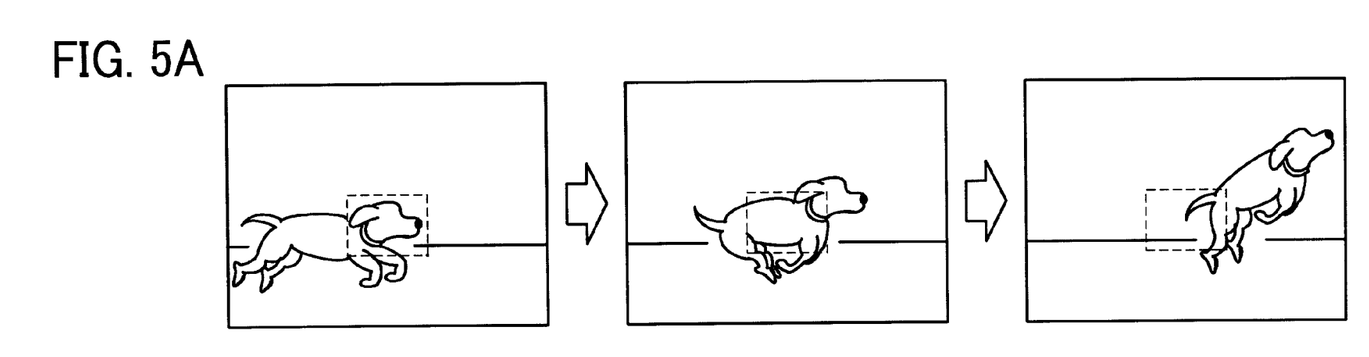
FIG. 5A is a diagram illustrating conventional frame-by-frame-forward operation on LCD.
Figure 5B:
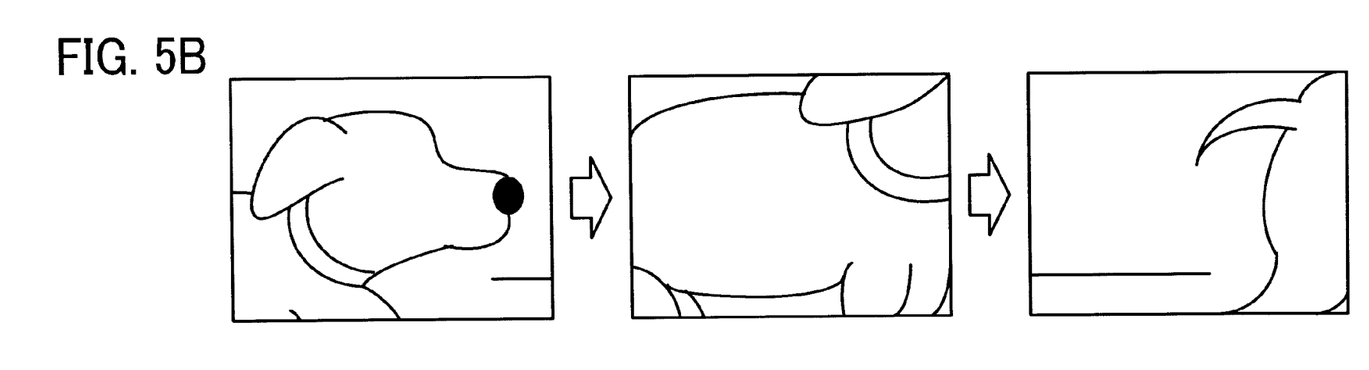
FIG. 5B is a diagram illustrating conventional enlarge-frame-by-frame-forward operation on LCD.

For comparison, FIG. 5 shows plural images that are enlarged and displayed frame-by-frame on the LCD monitor 12 by conventional enlarged-frame-by-frame-forward. FIG. 5A shows the whole area of the plural images. The area surrounded by the dashed line in FIG. 5A is enlarged and displayed on the LCD monitor 12. FIG. 5B shows a transition between the plural images enlarged and displayed on the LCD monitor 12.

As is shown in FIG. 5A, the area enlarged and displayed on the LCD monitor 12 is fixed with respect to the whole image according to conventional enlarged-frame-by-frame-forward. Even though the enlarged and displayed area (dashed line) shows the dog's face in the first image, the enlarged and displayed area moves from the dog's face to the dog's body in the second image and moves from the dog's body to the dog's tail in third image. In other words, the enlarged and displayed area moves from the dog's face to the dog's tail when proceeding frame-by-frame-forward. Although the dog's face is enlarged and displayed on the LCD monitor 12 in the first image, the enlarged and displayed area on the LCD display 12 moves from the dog's body to the dog's tail when proceeding frame-by-frame-forward. When performing frame-by-frame-backward, the display order is inverted and the result is similar to the frame-by-frame-forward case.

In conventional technology, the user has to modify the position of the enlarged and displayed area in the second and third image in order to confirm the dog's face. This operation may become extremely cumbersome.

Figure 6A:
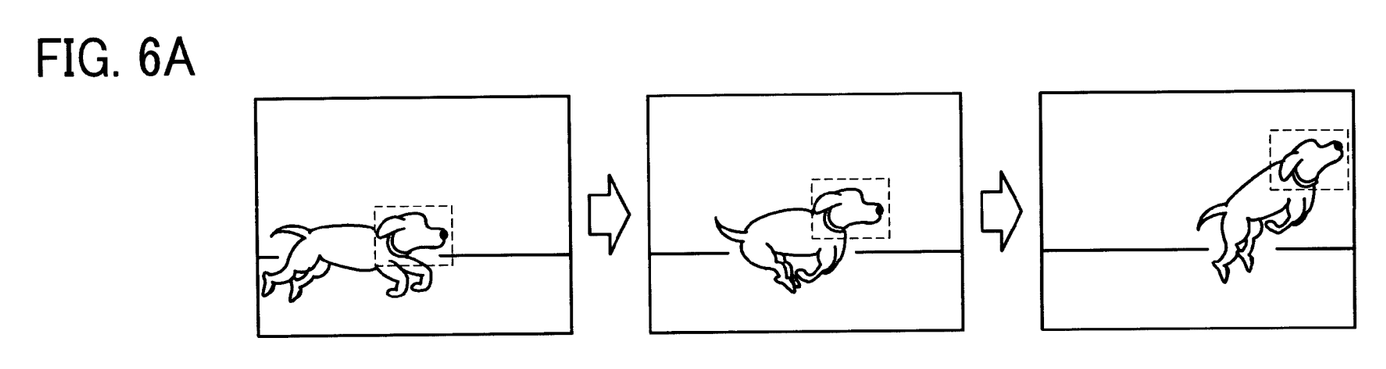
FIG. 6A is a diagram illustrating frame-by-frame-forward operation on LCD relating to a first embodiment.
Figure 6B:
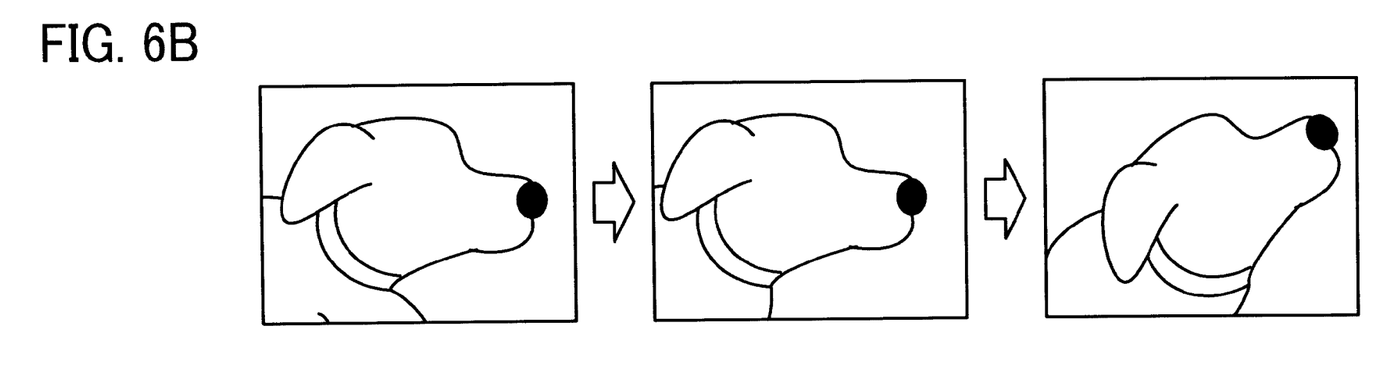
FIG. 6B is a diagram illustrating enlarge-and-track-frame-by-frame-forward operation on LCD relating to a first embodiment.

FIG. 6 shows plural images that are enlarged and displayed frame-by-frame on the LCD monitor 12 by enlarge-and-track-frame-by-frame-forward according to the digital camera of the present embodiment. FIG. 6A shows the whole area of each of the plural images. The area surrounded by the dashed line in FIG. 6A is enlarged and displayed on the LCD monitor 12. FIG. 6B shows the transition between the plural images enlarged and displayed on the LCD monitor 12.

When the enlarge-and-track-frame-by-frame-forward-(backward) operation of the present embodiment is available, an object included in the area enlarged and displayed on the LCD monitor 12 is set as the tracked target. The area, including the object set as the target, is detected in next image (later or earlier in time) and the detected area is enlarged and displayed on the LCD monitor 12.

For example, the user may enlarge and display a dog's face in the first image of FIG. 6A. When the dog's face is enlarged and displayed on the LCD monitor 12 in the first image of FIG. 6B, and the user keeps the display switch 24 pushed down for a predetermined period, the enlarge-and-track-frame-by-frame-forward-(backward) operation is executed and the dog's face is set as the target tracking object. When performing frame-by-frame-forward (operation of the right switch 21), the area including the dog's face in the second image of FIG. 6A is detected and the detected area including the dog's face is enlarged and displayed on the LCD monitor 12 shown as the second image in FIG. 6B. When performing further frame-by-frame-forward (operation of the right switch 21), the area including the dog's face in the third image of FIG. 6A is detected and the detected area including the dog's face is enlarged and displayed on the LCD monitor 12 shown as the third image in FIG. 6B. When performing the frame-by-frame-backward operation (operation of the left/image confirm switch 21), the displaying order is inverted and the result is similar to the frame-by-frame-forward operation (the operation of the right switch 20).

The digital camera of the present embodiment enlarges and displays plural images in series on the LCD monitor 12 by the enlarge-and-track-frame-by-frame-forward-(backward) operation.

The area including the object of interest (described as the dog's face in the example), among the plural images, is enlarged and displayed on the LCD monitor 12 without the need for a cumbersome operation. The user can confirm the plural images in order to select the best shot among the plural images effectively, quickly, and easily.

In the example shown in FIG. 6, the size of the object of interest (dog's face) does not substantially change among the plural displayed images. On the other hand, the size of an object may change among the plural images depending on how the object moves. The size of the object enlarged and displayed on the LCD monitor 12 becomes substantially the same among the plural images by determining an enlargement factor according to the size of the object in the whole image.

Figure 7A:
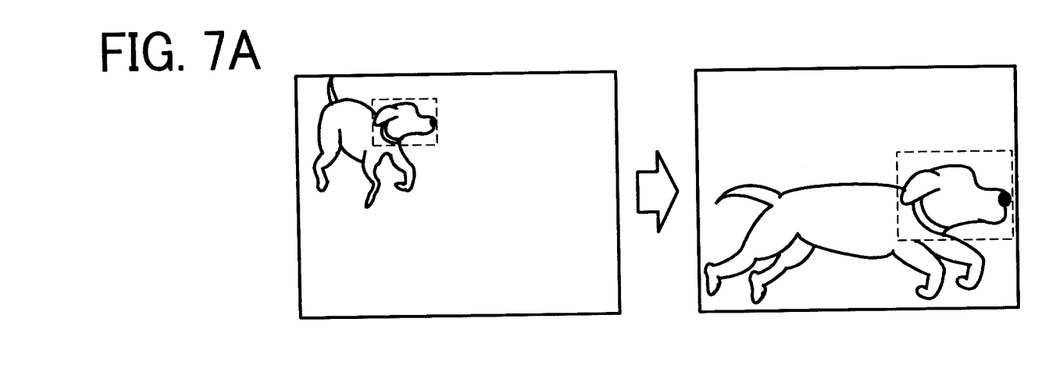
FIG. 7A is a diagram illustrating images in series on LCD when the object moves and changes its size.
Figure 7B:
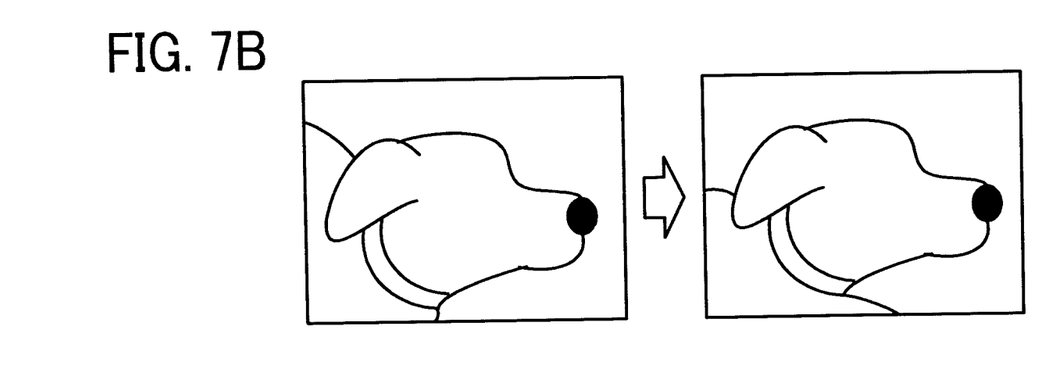
FIG. 7B is a diagram illustrating enlarge-and-track-frame-by-frame-forward operation on LCD as the object size is same among images in series.

In the case of FIG. 7, when the size of the object of interest (dog's face) changes among the plural displayed images, the size of the object enlarged and displayed on the LCD monitor 12 becomes substantially the same among the plural images. FIG. 7A shows the whole area of each of the plural images. The area surrounded by the dashed line in FIG. 7A is enlarged and displayed on the LCD monitor 12. FIG. 7B shows the transition between the plural images enlarged and displayed on the LCD monitor 12.

For example, the user may enlarge and display a dog's face in the first image of FIG. 7A. When the dog's face is enlarged and displayed on the LCD monitor 12 in the first image of FIG. 7B, and the user keeps the display switch 24 pushed in for a predetermined period, the enlarge-and-track-frame-by-frame-forward-(backward) operation is executed and the dog's face is set as the target tracking object. When performing frame-by-frame-forward (operation of the right switch 21), the area including the dog's face in the second image of FIG. 7A is detected. The size of the dog's face in the second image of FIG. 7A is larger than the size of the dog's face in the first image of FIG. 7A. The enlargement factor for the area including the dog's face in the second image is smaller than the enlargement factor for the area including the dog's face in the first image taking into account the ratio of the size of the dog's face in the first image and the size of the dog's face in the second image. Therefore, the size of the dog's face, enlarged and displayed on the LCD monitor 12, is set to be substantially the same in the first image and the second image.

As shown in FIG. 6, the object of interest (dog's face) is detected on three images in the series. However, the object of interest may temporarily exit the frame in the case of continuous shooting and a fast moving object. When the object of interest is not detected among any of the plural images, the area enlarged and displayed remains the same as the enlarged and displayed area of the former displayed image. Thereafter, when the object of interest is detected in the next displayed image by the frame-by-frame-forward-(backward) operation, the detected area is enlarged and displayed. Therefore, even though the object of interest is missed in some of the images, the tracking of the object is not ended and the user does not need to reset the object as the target again. This reduces the difficultly of the operation.

Figure 8A:
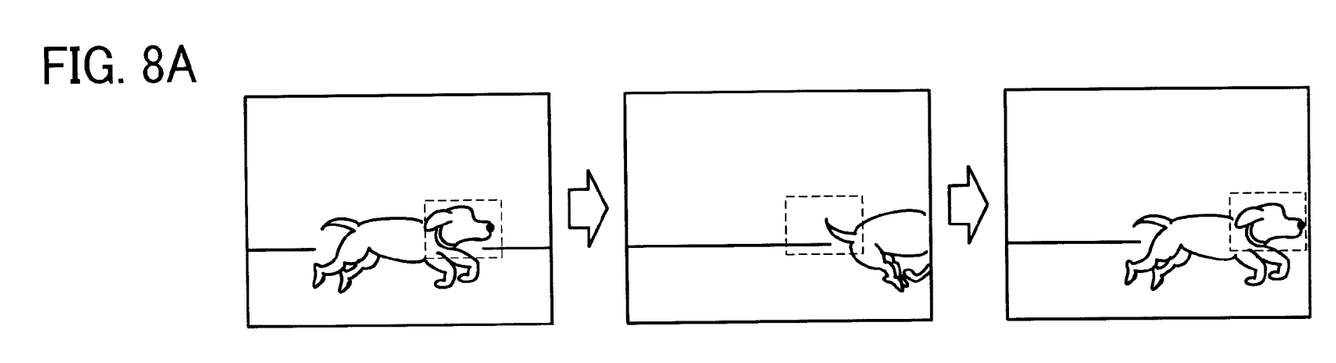
FIG. 8A is a diagram illustrating images in series on LCD when the object gets out of frame and gets back.
Figure 8B:
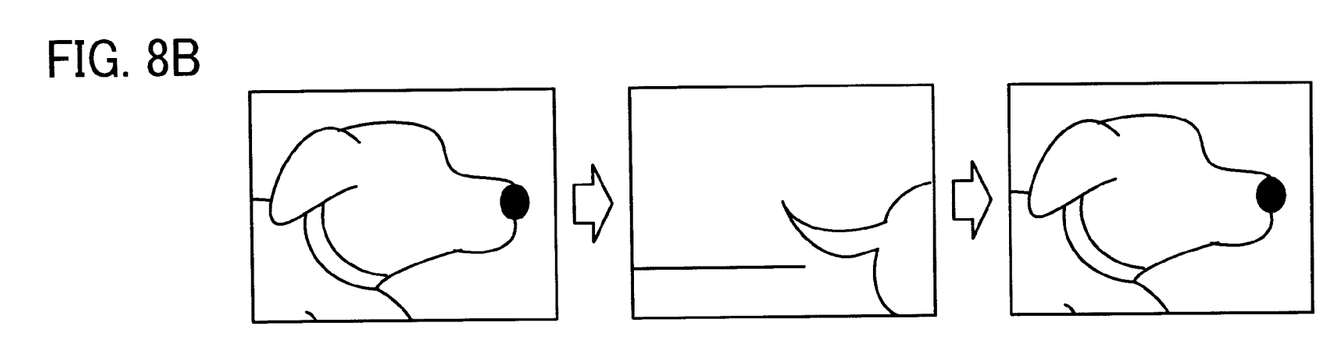
FIG. 8B is a diagram illustrating enlarge-and-track-frame-by-frame-forward operation on LCD as the object gets out of frame and gets back.

FIG. 8 shows the enlarged and displayed images in series on the LCD monitor 12 using the enlarge-and-track-frame-by-frame-forward-(backward) operation. Further, FIG. 8 illustrates the example of the object of interest temporarily exiting the frame and returning into the frame between the plural images. FIG. 8A shows the whole area of each of the plural images. The area surrounded by a dashed line in FIG. 8A is enlarged and displayed on the LCD monitor 12. FIG. 8B shows the transition between the plural images enlarged and displayed on the LCD monitor 12.

For example, the user enlarges and displays the dog's face in the first image of FIG. 8A. When the dog's face is enlarged and displayed on the LCD monitor 12 in the first image of FIG. 8B, and the user keeps the display switch 24 pushed in for a period, the enlarge-and-track-frame-by-frame-forward-(backward) operation is executed and the dog's face is set as the target for tracking. When performing frame-by-frame-forward (operation of the right switch 21), and the area including the dog's face in the second image of FIG. 8A is not detected despite the detecting process, the same area as the first image in FIG. 8A is enlarged and displayed. Therefore, as is shown in the second image of FIG. 8B, the dog's tail is temporarily enlarged and displayed on the LCD monitor 12.

Thereafter, when performing frame-by-frame-forward (operation of the right switch 21), the dog's face is detected in the third image of FIG. 8A. Since the dog's face is detected in the third image of FIG. 8A, the area including the detected dog's face is enlarged and displayed on the LCD monitor 12. Thus, the dog's face is again enlarged and displayed on the LCD monitor 12 as shown in third image of FIG. 8B. When performing the frame-by-frame-backward operation (operation of the left/image confirm switch 21), the display order is inverted but the result is similar to the frame-by-frame-forward operation (the operation of the right switch 20).

Second Embodiment

The digital camera of the present embodiment includes the tracking object block, implemented by a processor, used for capturing and which has a tracking function for performing AF (auto focus) and AE (auto exposure) on an object to be photographed. The digital camera of present embodiment uses information to track the object when plural images, obtained by continuous shooting, are enlarged and displayed frame-by-frame. As a result, the process of enlarge-and-track-frame-by-frame-forward-(backward) becomes faster. The basic composition and operation of the digital camera of the present embodiment are the same as those of first embodiment. The characteristic of the present embodiment is described below with common explanations being omitted.

The image data, by which the tracking object block tracks the object, is recorded with information enabling common tracking of the object. Specifically, metadata such as Exif (Exchangeable Image File) data, which includes information enabling tracking of the object by the tracking object block, can be added to the image data. As described above, plural images obtained by continuous shooting may be saved in one file such as of the Multi-Picture Format. Exif data can be added to the image data included in the Multi-Picture Format file.

According to the present embodiment, the Exif data includes coordinate information for the area including the object tracked by the tracking object block. The information added to image data may be other information specifying the area including object tracked by the tracking object block. For example, an image may be divided into plural blocks in a predetermined manner. Instead of coordinate information, information specifying the block including the object tracked by the tracking object block can be added.

Similar to the first embodiment, when the user keeps the display switch 24 pushed for a period while part of the first image is enlarged and displayed on the LCD monitor 12, the target setting block 101 in the CPU 61 sets an object included in the part of first image, enlarged and displayed on the LCD monitor 12, as the target for the enlarge-and-track-frame-by-frame-forward-(backward) operation. If the currently displayed image is an image obtained by continuous shooting, the CPU 61 checks whether the object set as the target for enlarge-and-track-frame-by-frame-forward-(backward) operation corresponds to an object tracked by the tracking object block.

Specifically, the CPU 61 compares the coordinates for the part of the first image enlarged and displayed on the LCD monitor 12 with the coordinate information included in the Exif data of the first image (the coordinate information for the area including the object tracked by the tracking object block). The CPU 61 checks whether the part of the first image enlarged and displayed on the LCD monitor 12 corresponds to the area including the object tracked by the tracking object block. The phrase "corresponds to" means not only corresponding perfectly but also corresponding in a way such that both areas include some portion of the object. For example, if certain percentage (such as 80%) of the part of first image enlarged and displayed on the LCD monitor 12 overlaps the area including the object tracked by the tracking object block, the CPU 61 concludes that the areas correspond to each other.

When the part of the first image enlarged and displayed on the LCD monitor 12 corresponds to the area including object tracked by the tracking object block, the object tracking is simplified in the enlarge-and-track-frame-by-frame-forward-(backward) operation. When performing the frame-by-frame-forward-(backward) operation in the case that the enlarge-and-track-frame-by-frame-forward-(backward) operation is available, the display control block 103 obtains coordinate information from the Exif data included in the next displayed image data. This obtaining process is performed without the detecting block 102 detecting the area, including the object set as the target, from the next displayed image data. Once the coordinate information is obtained, the area corresponding to the coordinate information is enlarged and displayed on the LCD monitor 12. In other words, when the object set as the target for the enlarge-and-track-frame-by-frame-forward-(backward) operation corresponds to the object tracked by the tracking object block, the digital camera of present embodiment utilizes information available at the time of capturing without performing a detecting process in the enlarge-and-track-frame-by-frame-forward-(backward) operation. As a result, the process becomes simpler and faster.

Figure 9A:
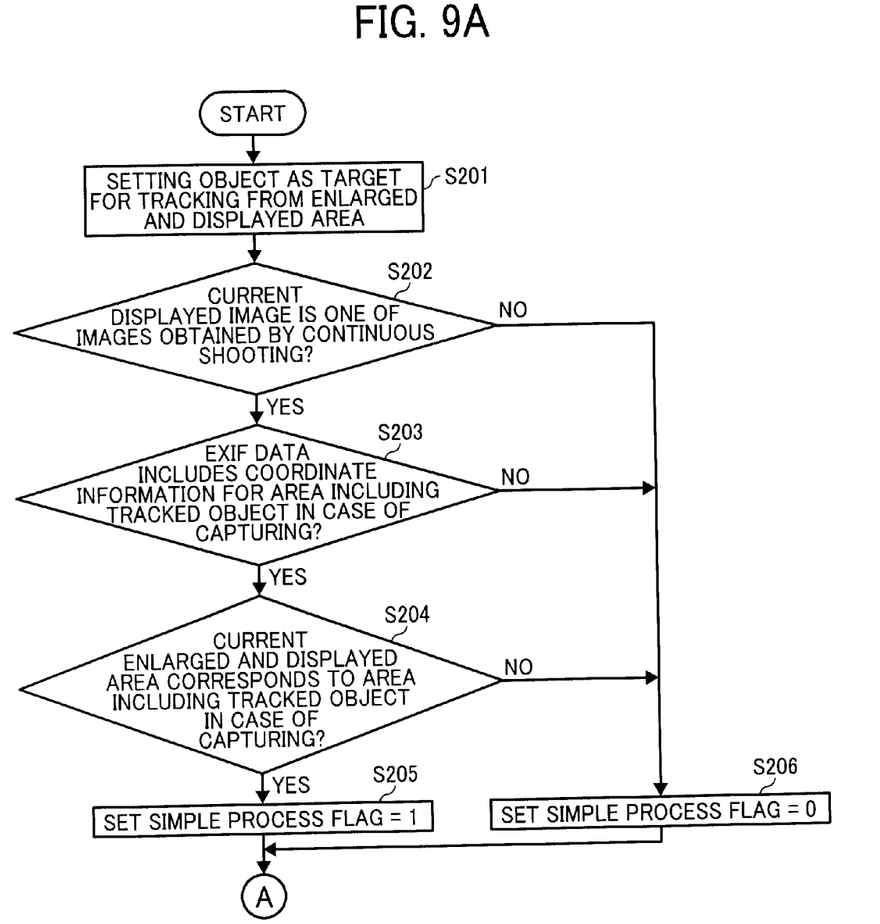
FIGS. 9A and 9B are a flowchart illustrating a process flow for CPU in case performing enlarge-and-track-frame-by-frame-forward-(backward) operation relating to a second embodiment of the digital still camera.
Figure 9B:
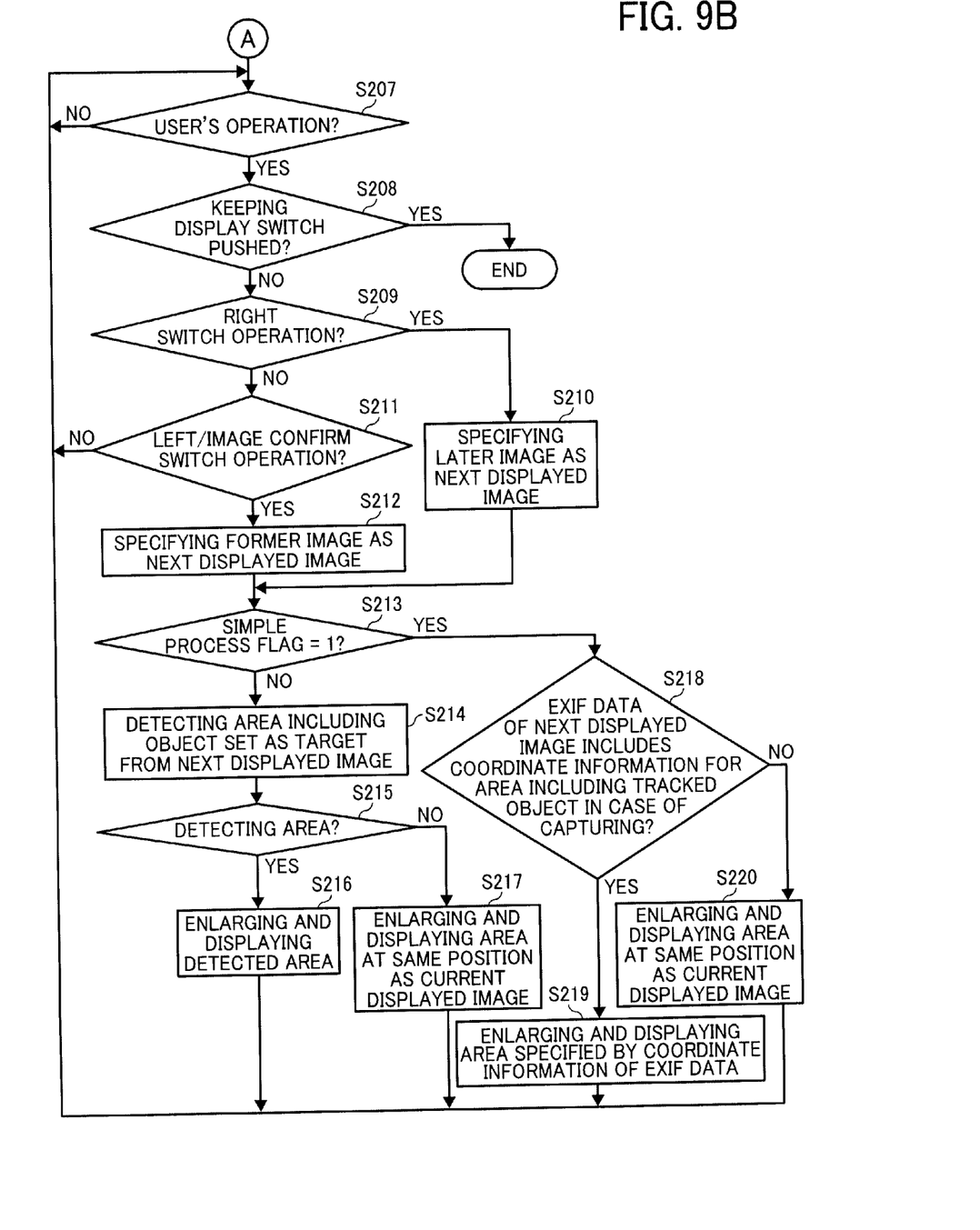

With respect to the digital camera of the present embodiment, FIGS. 9A&B are a flowchart illustrating a process flow for the CPU 61 performing the enlarge-and-track-frame-by-frame-forward-(backward) operation. The process flow shown in FIG. 9A starts when the user keeps the display switch 24 pushed in for a period when part of the image is enlarged and displayed on the LCD monitor 12, in the same manner as is described with respect to FIG. 4.

The target setting block 101 of the CPU 61 sets an object as the target for tracking, from an object included in the area currently enlarged and displayed on the LCD monitor 12 (step S201), in the same manner as step S101 in FIG. 4. When the step S201 finishes, the flow proceeds to step S202.

The CPU 61 checks whether an image included in the area enlarged and displayed on the LCD monitor 12 is one of the images captured by continuous shooting (step S202). For example, the CPU 61 checks whether the image is taken from a file of the Multi-Picture Format. If the image, including the area enlarged and displayed on the LCD monitor 12, is one of the images captured by continuous shooting (step S202 YES), the flow proceeds to step S203. If the image is captured individually (step S202 NO), the flow proceeds to step S206.

The CPU 61 checks whether the Exif data of the image, including the area enlarged and displayed on the LCD monitor 12, includes coordinate information for an area including the object tracked by the tracking object block (step S203). If the Exif data includes the coordinate information (step S203 YES), the flow proceeds to step S204. If the Exif data does not include coordinate information (step S204 NO), the flow proceeds to step S206.

The CPU 61 checks whether the area currently enlarged and displayed on the LCD monitor 12 corresponds to the area including the object tracked by the tracking object block (step S204). If both areas correspond to each other (step S204 YES), the flow proceeds to step S205. If not (step S204 NO), the flow proceeds goes to step S206.

In step S205, the CPU 61 sets a simple process flag to 1. The simple process flag is 1-bit data and indicates that the tracking object is being performed simply as described above in the enlarge-and-track-frame-by-frame-forward-(backward) operation. In particular, when the simple process flag is 1, the simple tracking process is performed. When the simple process flag is 0, the simple tracking process is not performed. When step S205 finishes, the flow proceeds to S207.

In step S206, the CPU 61 sets the simple process flag to 0. When step S206 finishes, the flow proceeds to S207.

As in step S102, the CPU 61 checks whether the user operates the operation unit 100 (step S207). If the user performs some operation (step S207 YES), the flow proceeds to step S208. If the user does not perform any operation (step S207 NO), the CPU 61 continues checking.

As in step S103, the CPU 61 checks whether the user's operation is to keep the display switch 24 pushed in for a period (step S208). If the user's operation is not to keep the display switch 24 pushed (step S208 NO), the flow proceeds to step S209. If the user's operation is to keep the display switch 24 pushed for a period (step S208 YES), the process flow finishes in FIG. 9B. When the process flow finishes, the mode of the digital camera returns to normal enlarge and display mode.

As in step S104, the CPU 61 checks whether the user operates the right switch 21 (step S209). If the user operates the right switch 21 (step S209 YES), the flow proceeds to step S210. If the user does not operate the right switch 21 (step S209 NO), the flow proceeds to step S211.

As in step S105, the detecting block 102 in the CPU 61 specifies a later in time image, from the current image having a part which is enlarged and displayed on the LCD monitor 12, as the next displayed image (step S210). When step S210 finishes, the flow proceeds to step S213.

As in step S106, the CPU 61 checks whether the user operates the left/image confirm switch 20 (step S211). If the user operates the left/image confirm switch 20 (step S211 YES), the flow proceeds to step S212. If the user does not operate the left/image confirm switch 20 (step S211 NO), the flow proceeds to step S207 since the operation is not valid with respect to the enlarge-and-track-frame-by-frame-forward-(backward) operation.

As in step S107, the detecting block 102 in the CPU 61 specifies a previous in time image, from the current image having a part which is enlarged and displayed on the LCD monitor 12, as the next displayed image (step S212). When the step S212 finishes, the flow proceeds to step S213.

The display control block 103 checks whether the simple process flag is 1 (step S213). If simple process flag is 0 (step S213 NO), the flow proceeds to step S214. If simple process flag is 1 (step S213 YES), the flow proceeds to step S218.

As in step S108, the detecting block 102 detects the area including the object set as the target in step S201 from the next displayed image (step S214). When step S214 finishes, the flow proceeds to step S215.

As in step S109, the display control block 103 in the CPU 61 determines whether to detect the area including the object for tracking from the next displayed image in either step S210 or S212 (step S215). If the area is determined to be detected (step S215 YES), the flow proceeds to step S216. If the area is determined not to be detected (step S215 NO), the flow proceeds to step S217.

As in step S110, the display control block 103 outputs a command to the display controller 66 that enlarges and displays the area, detected in step S215, on the LCD monitor 12 (step S216). According to step S216, the display of the LCD monitor 12 is updated and the area, including the object (tracked target) in the next displayed image, is enlarged and displayed on the LCD monitor 12. When step S216 finishes, the flow returns to step S207.

As shown the step S111, the display control block 103 outputs a command to the display output controller 66 keeping the coordinate information and enlargement factor of the area enlarged and displayed the same, when the next displayed image, specified in either step S210 or S212, is displayed (step S217). In step S217, the display of the LCD monitor 12 is updated and the area enlarged and displayed remains the same as the area in the currently enlarged and displayed image on the LCD monitor 12. When step S217 finishes, the flow returns to step S207.

The display control block checks whether the Exif data of the next displayed image, specified in the step S210 or S212, includes the coordinate information corresponding to an area including the object tracked by the tracking object block (step S218). If the coordinate information is included (step S218 YES), the flow proceeds to step S219. If the coordinate information is not included (step S218 NO), the flow proceeds to step S220.

The display control block 103 outputs a command to the display output controller 66 to enlarge and display the area specified by the coordinate information in Exif data, when the next displayed image, specified in step S210 or S212, is displayed (step S219). In step S219, the display of the LCD monitor 12 is updated and the area, including the object tracked by the tracking object block, is enlarged and displayed on the LCD monitor 12. When step S219 finishes, the flow returns to step S207.

In step S220, the display control block 103 outputs a command to the display output controller 66 to not change the coordinate information and the enlargement factor of the enlarged and displayed area, when the next displayed image, specified in step S210 or S212, is displayed.

In step S220, the display of the LCD monitor 12 is updated and the area enlarged and displayed remains the same as the area currently enlarged and displayed image on the LCD monitor 12. When step S220 finishes, the flow returns to step S207.

When plural images, captured by continuous shooting mode, are displayed in the enlarge-and-track-frame-by-frame-forward-(backward) operation, and the plural images are captured by tracking the object and the image data of the plural images includes information specifying the tracked area (coordinate information), the digital camera of the present embodiment utilizes the information specifying tracked area. In other words, when the object set as the target in the enlarge-and-track-frame-by-frame operation is the same as the object for capturing, the simple process is performed. In the simple process, the area, specified by the information indicating the tracked area included in the next displayed image, is enlarged and displayed. The detecting process (such as template matching), that detects the target object from next displayed image, is omitted. According to the digital camera of the present embodiment, the detecting process, which has the highest processing load in the enlarge-and-track-frame-by-frame-forward-(backward) operation, can be omitted resulting in faster processing.

Although the invention has been described with respect to specific embodiments, the claims are not limited thereto but are construed as embodying all modifications and alternative constructions that may occur to one skilled in the art that fairly fall within the basic teaching herein set forth. The construction and operation of the digital camera of the present embodiments are exemplarily described and can be modified in various manners according to purpose and use.

The described embodiments describe the example of application to a digital camera including an image capturing device. Alternatively, the present embodiments may be applied to an image display apparatus which displays an image read out from recording media (e.g. memory card) or taken from another device connected directly thereto or to a communication network. The function of the target setting and detecting object is performed by a control program executed by a CPU which controls the image display apparatus or by specific hardware such as ASIC or FPGA. The image display apparatus having the function which is the same as the digital camera explained above can also be realized.

What is claimed is:

1. An image apparatus, comprising:
an image capture device that captures an image;
a display device that displays the image;
a microprocessor configured to implement;

a display control block that enlarges and displays a first area included in a first image on the display device;

a target setting block that sets, in a replay mode, an object in the first area as a target for tracking; and a detecting block that detects, in the replay mode, a second area including the object in a second image which is specified to be displayed on the display device instead of the first image;

wherein the display control block enlarges and displays the second area on the display device in the replay mode.

2. The image apparatus as claimed in claim 1, wherein the first image and the second image are each one of plural images obtained by continuous shooting.

3. The image apparatus as claimed in claim 1, wherein the display control block determines an enlargement factor when displaying the second image on the display device according to a proportion of a size of the target in the first image to a size of the target in the second image.

4. The image apparatus as claimed in claim 1, wherein the display control block enlarges and displays an area in the second image, a position of the area in the second image being the same as a position of the first area in the first image, when the second area, including the object, is not detected in the second image by the detecting block.

5. The image apparatus as claimed in claim 4, wherein the display control block enlarges and displays a third area on the display device when the detecting block detects the third area, including the object, in a third image which is specified to be displayed next on the display device in place of the second image.

6. The image apparatus as claimed in claim 1, wherein the microprocessor is further configured to implement a tracking object block that tracks the object when the image capture device captures the image, and wherein the detecting block and the tracking object block use a common technique, and the detecting block uses this common technique to detect the second area from the second image.

7. The image apparatus as claimed in claim 1, wherein the microprocessor is further configured to implement a tracking object block that tracks the object when the image capture device captures the image, wherein an image captured by the image capture device includes tracking area information, which specifies an area of the image that includes the object tracked by the tracking object block, and wherein the display control block enlarges and displays the area of the second image specified by the tracking area information of the second image when the first area enlarged and displayed on the display device corresponds to the area specified by the tracking area information.

8. A display apparatus, comprising:

a display device that displays an image;

a microprocessor configured to implement:

a display control block that enlarges and displays a first area included in a first image on the display device, a target setting block that sets, in a replay mode, an object in the first area as a target for tracking, and a detecting block that detects, in a replay mode, a second area, including the object, in a second image which is specified to be displayed next on the display device in place of the first image, wherein the display control block enlarges and displays the second area on the display device in the replay mode.

9. A displaying method performed by a display apparatus including a display device that displays an image and a microprocessor, comprising:

enlarging and displaying a first area included in a first image on the display device;

setting, in a replay mode, an object in the first area as a target for tracking;

detecting, in a replay mode, a second area, including the object, in a second image which is specified to be displayed next on the display device in place of the first image; and enlarging and displaying the second area on the display device in the replay mode.

10. The image apparatus according to claim 1, wherein the detecting block detects, in the replay mode, the second area including the object in the second image when a switching command is received that requests that the second image be displayed on the display device instead of the first image.

11. The image apparatus according to claim 1, wherein the display control block enlarges and displays the second area on the display device replacing a display of the first image on the display device.

* * * * *